US011836638B2

(12) United States Patent
Agarwal et al.

(10) Patent No.: US 11,836,638 B2
(45) Date of Patent: Dec. 5, 2023

(54) BILSTM-SIAMESE NETWORK BASED CLASSIFIER FOR IDENTIFYING TARGET CLASS OF QUERIES AND PROVIDING RESPONSES THEREOF

(71) Applicant: Tata Consultancy Services Limited, Mumbai (IN)

(72) Inventors: Puneet Agarwal, Noida (IN); Prerna Khurana, Noida (IN); Gautam Shroff, Gurgaon (IN); Lovekesh Vig, Gurgaon (IN); Ashwin Srinivasan, Pilani (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1298 days.

(21) Appl. No.: 15/912,382

(22) Filed: Mar. 5, 2018

(65) Prior Publication Data

US 2019/0080225 A1    Mar. 14, 2019

(30) Foreign Application Priority Data

Sep. 11, 2017 (IN) .............................. 201721032101

(51) Int. Cl.
  *G06N 5/04* (2023.01)
  *G06F 18/22* (2023.01)
  (Continued)

(52) U.S. Cl.
  CPC .............. *G06N 5/04* (2013.01); *G06F 16/35* (2019.01); *G06F 18/22* (2023.01);
  (Continued)

(58) Field of Classification Search
  CPC .............................. G06N 3/0454; G06F 16/35
  (Continued)

(56) References Cited

U.S. PATENT DOCUMENTS

2011/0131205 A1* 6/2011 Iyer ..................... G06F 16/3334
                                                707/728
2011/0145290 A1* 6/2011 Fujii ................... G01C 21/3484
                                                707/780

(Continued)

OTHER PUBLICATIONS

Phan, 2016, "Robust Audio Event Recognition with 1-Max Pooling Convolutional Neural Networks" (Year: 2016).*

(Continued)

*Primary Examiner* — Abdullah Al Kawsar
*Assistant Examiner* — Jun Kwon
(74) *Attorney, Agent, or Firm* — Finnegan, Henderson, Farabow, Garrett & Dunner LLP

(57) ABSTRACT

Organizations are constantly flooded with questions, ranging from mundane to the unanswerable. It is therefore respective department that actively looks for automated assistance, especially to alleviate the burden of routine, but time-consuming tasks. The embodiments of the present disclosure provide BiLSTM-Siamese Network based Classifier for identifying target class of queries and providing responses to queries pertaining to the identified target class, which acts as an automated assistant that alleviates burden of answering queries in well-defined domains. Siamese Model (SM) is trained for a epochs, and then the same Base-Network is used to train Classification Model (CM) for b epochs iteratively until best accuracy is observed on validation test, wherein SM ensures it learns which sentences are similar/dissimilar semantically while CM learns to predict target class of every user query. Here a and b are assumed to be hyper parameters and are tuned for best performance on the validation set.

9 Claims, 9 Drawing Sheets

(51) Int. Cl.
G06F 18/2415 (2023.01)
G06N 3/045 (2023.01)
G06N 3/044 (2023.01)
G06F 16/35 (2019.01)
G06N 3/08 (2023.01)

(52) U.S. Cl.
CPC ......... *G06F 18/2415* (2023.01); *G06N 3/044* (2023.01); *G06N 3/045* (2023.01); *G06N 3/08* (2013.01)

(58) Field of Classification Search
USPC .......................................................... 706/26
See application file for complete search history.

(56) References Cited

U.S. PATENT DOCUMENTS

| | | | | |
|---|---|---|---|---|
| 2017/0357896 | A1* | 12/2017 | Tsatsin | |
| 2018/0349477 | A1* | 12/2018 | Jaech | G06Q 10/1053 |
| 2018/0359416 | A1* | 12/2018 | Hold-Geoffroy | G06F 16/335 |
| 2019/0043486 | A1* | 2/2019 | Salloum | G06N 3/0427 |

OTHER PUBLICATIONS

Huang, 2016, "Instance-aware Image and Sentence Matching with Selective Multimodal LSTM" (Year: 2016).*

Athavale et al, 2016, "Towards Deep Learning in Hindi NER: An approach to tackle the Labelled Data Scarcity" (Year: 2016).*

Koch, 2015, "Siamese Neural Networks for One-Shot Image Recognition" (Year: 2015).*

Geng et al, 2016, "Deep Transfer Learning for Person Re-identification" (Year: 2016).*

Neculoiu et al, 2016, "Learning Text Similarity with Siamese Recurrent Networks" (Year: 2016).*

Kottur et al, 2016, "Visual Word2Vec (vis-w2v): Learning Visually Grounded Word Embeddings Using Abstract Scenes" (Year: 2016).*

Szoke et al, 2016, "Coping With Channel Mismatch in Query-By-Example—But Quesst 2014" (Year: 2015).*

Zmolikova et al, 2016, "Data selection by sequence summarizing neural network in mismatch condition training" (Year: 2016).*

Hsieh & Chen, 1993, "A Neural Network Model which Combines Unsupervised and Supervised Learning" (Year: 1993).*

Ustinova & Lempitsky, 2016, "Learning Deep Embeddings with Histogram Loss" (Year: 2016).*

Johnson, 1979, "Determining Probability Distributions By Maximum Entropy and Minimum Cross-Entropy" (Year: 1979).*

Bellemare et al, May 2017, "The Cramer Distance as a Solution to Biased Wasserstein Gradients" (Year: 2017).*

Banerjee, A. et al. "Multi-way Clustering on Relation Graphs," *Proceedings of the 2007 SIAM International Conference on Data Mining*, Minneapolis, MN, Apr. 26-28, 2007; 12 pages.

Gehring, J. et al. (Jul. 2017). "A Convolutional Encoder Model for Neural Machine Translation," *Facebook AI Research*; 13 pages.

Wang, Z. et al. "Bilateral Multi-Perspective Matching for Natural Language Sentences," *Proceedings of the 26th International Joint Conference on Artificial Intelligence*, Melbourne, AU, Aug. 19-25, 2017; 7 pages.

* cited by examiner

US 11,836,638 B2

BILSTM-SIAMESE NETWORK BASED CLASSIFIER FOR IDENTIFYING TARGET CLASS OF QUERIES AND PROVIDING RESPONSES THEREOF

PRIORITY CLAIM

This U.S. patent application claims priority under 35 U.S.C. § 119 to: India Application No. 201721032101, filed on Sep. 11, 2017. The entire contents of the aforementioned application are incorporated herein by reference.

TECHNICAL FIELD

The disclosure herein generally relate to frequently asked questions (FAQ) assistance systems, and, more particularly, to a Bidirectional Long-Short Term Memory (BiLSTM)-Siamese network based classifier for identifying target class of queries and providing responses thereof.

BACKGROUND

Recently deep learning algorithms have gained huge popularity owing to their incredible performances in the fields of computer vision and speech recognition tasks. One of the seminal works in Natural Language processing (NLP) that solved tasks such as, for example, Part-Of-Speech tagging, chunking, Named Entity Recognition and Semantic Role Labeling used convolutional neural networks (CNNs). CNNs have been used for text classification task using word level as well as character level approaches, these networks capture local features using convolutional filters. Particularly, chatbots implementing neural networks, have attracted due attention of the researchers and have given rise to many different lines of work, such as the one involving open-domain question answering using large knowledge graphs. Yet another line of work was concerned with building a generative model for dialogue generation, some of them use sequence-2-sequence model, which takes a question as input and attempts to generate the answer automatically. Similarly, another very prolific line of research involved the use of reinforcement learning to answer users' question in a dialogue based system. Key issue with these generative models is that they often output grammatically wrong sentences, while the answers are required to be legally correct.

SUMMARY

Embodiments of the present disclosure present technological improvements as solutions to one or more of the above-mentioned technical problems recognized by the inventors in conventional systems. For example, in one aspect, a processor implemented method for identifying target class of queries and outputting responses thereof is provided. The processor implemented method, comprising: obtaining by the Bidirectional Long-Short Term Memory (BiLSTM)-Siamese network based classifier, via one or more hardware processors, one or more user queries, wherein the one or more user queries comprises of a sequence of words, wherein the BiLSTM-Siamese network based classifier system comprises a Siamese model and a classification model, and wherein the Siamese model and the classification model comprise a common base network that includes an embedding layer, a single BiLSTM layer and a Time Distributed Dense (TDD) Layer; iteratively performing: representing in the embedding layer of the common base network, the one or more user queries as a sequence of vector representation of each word learnt using a word to vector model, wherein the sequence of words is replaced by corresponding vectors and the corresponding vectors are initialized using the word to vector model, and wherein the corresponding vectors are continually updated during training of the BiLSTM-Siamese network based classifier; inputting, to the single BiLSTM layer of the common base network, the sequence of vector representation of each word to generate one or more 't' hidden states at every timestep, wherein the vector representation of each word is inputted in at least one of a forward order and a reverse order; processing through the Time Distributed Dense (TDD) Layer of the common base network, an output obtained from the single BiLSTM layer to obtain a sequence of vector; obtaining, using a maxpool layer of the classification model, dimension-wise maximum value of the sequence of vector to form a final vector; and determining by a softmax layer of the classification model, at least one target class of the one or more queries based on the final vector formed and outputting a response to the one or more queries based on the determined target class, wherein a Square root Kullback-Leibler divergence (KLD) Loss Function is applied to the sequence of vector to optimize the classification model.

In an embodiment, the method may further include determining, during training of the BiLSTM-Siamese network based classifier, one or more errors pertaining to a set of queries, wherein the one or more errors comprise one or more target classes being determined for the set of queries; generating a set of misclassified query-query pairs based on the one or more errors; and iteratively training, the Siamese model using the set of misclassified query-query pairs along with one or more correct pairs for determining a target class and outputting responses for one or more subsequent queries, wherein one or more weights of the Base network are shared with the Siamese model and the Classification model during the training of the BiLSTM-Siamese network based classifier.

In an embodiment, the method may further include obtaining, using the one more shared weights, a plurality query embeddings by passing the one or more queries through the Siamese model; applying a contrastive divergence loss on the plurality of query embeddings to optimize the Siamese model; and updating one or more parameters of the BiLSTM-Siamese network based classifier. In an embodiment, the step of applying a contrastive divergence loss comprises: calculating, Euclidean distance between the plurality of query embeddings; and computing the contrastive divergence loss based on the calculated Euclidean distance.

In another aspect, a Bidirectional Long-Short Term Memory (BiLSTM)-Siamese Network based Classifier system for identifying target class of queries and outputting responses thereof is provided. The system comprising: a memory storing instructions; one or more communication interfaces; and one or more hardware processors coupled to the memory via the one or more communication interfaces, wherein the one or more hardware processors are configured by the instructions to: obtain by the Bidirectional Long-Short Term Memory (BiLSTM)-Siamese network based classifier system, via one or more hardware processors, one or more user queries, wherein the one or more user queries comprises of a sequence of words, wherein the BiLSTM-Siamese network based classifier system comprises a Siamese model and a classification model, and wherein the Siamese model and the classification model comprise a common base network that includes an embedding layer, a single BiLSTM layer and a Time Distributed Dense (TDD)

Layer; iteratively perform: representing in the embedding layer of the common base network, the one or more user queries as a sequence of vector representation of each word learnt using a word to vector model, wherein the sequence of words is replaced by corresponding vectors and the corresponding vectors are initialized using the word to vector model, and wherein the corresponding vectors are continually updated during training of the BiLSTM-Siamese network based classifier; inputting, to the single BiLSTM layer of the common base network, the sequence of vector representation of each word to generate one or more 't' hidden states at every timestep, wherein the vector representation of each word is inputted in at least one of a forward order and a reverse order; processing through the Time Distributed Dense (TDD) Layer of the common base network, an output obtained from the single BiLSTM layer to obtain a sequence of vector; obtaining, using a maxpool layer of the classification model, dimension-wise maximum value of the sequence of vector to form a final vector; and determining by using a softmax layer of the classification model, at least one target class of the one or more queries based on the final vector and outputting a response to the one or more queries based on the determined target class, wherein a Square root Kullback-Leibler divergence (KLD) Loss Function is applied to the sequence of vector to optimize the classification model.

In an embodiment, the one or more hardware processors may be further configured by the instructions to: determine, during training of the Hybrid BiLSTM-Siamese network based classifier, one or more errors pertaining to a set of queries, wherein the one or more errors pertaining to one or more target classes being determined for the set of queries; generate a set of misclassified query-query pairs; and iteratively train, the Siamese model using the set of misclassified query-query pairs along with one or more correct pairs for determining a target class and outputting responses for one or more subsequent queries, wherein one or more weights of the Base network are shared with the Siamese model and the Classification model during the training of the BiLSTM-Siamese network based classifier system.

In an embodiment, the one or more hardware processors may be further configured by the instructions to: obtain, using the one or more shared weights, a plurality query embeddings by passing the one or more queries through the Siamese model; apply a contrastive divergence loss on the plurality of query embeddings to optimize the Siamese model; and update one or more parameters of the BiLSTM-Siamese network based classifier system. In an embodiment, the contrastive divergence loss is applied by calculating, a Euclidean distance between the plurality of query embeddings; and computing the contrastive divergence loss based on the calculated Euclidean distance.

In yet another aspect, one or more non-transitory machine readable information storage mediums comprising one or more instructions is provided. The one or more instructions which when executed by one or more hardware processors causes obtaining by the Bidirectional Long-Short Term Memory (BiLSTM)-Siamese network based classifier, via one or more hardware processors, one or more user queries, wherein the one or more user queries comprises of a sequence of words, wherein the BiLSTM-Siamese network based classifier system comprises a Siamese model and a classification model, and wherein the Siamese model and the classification model comprise a common base network that includes an embedding layer, a single BiLSTM layer and a Time Distributed Dense (TDD) Layer; iteratively performing: representing in the embedding layer of the common base network, the one or more user queries as a sequence of vector representation of each word learnt using a word to vector model, wherein the sequence of words is replaced by corresponding vectors and the corresponding vectors are initialized using the word to vector model, and wherein the corresponding vectors are continually updated during training of the BiLSTM-Siamese network based classifier; inputting, to the single BiLSTM layer of the common base network, the sequence of vector representation of each word to generate one or more 't' hidden states at every timestep, wherein the vector representation of each word is inputted in at least one of a forward order and a reverse order; processing through the Time Distributed Dense (TDD) Layer of the common base network, an output obtained from the single BiLSTM layer to obtain a sequence of vector; obtaining, using a maxpool layer of the classification model, dimension-wise maximum value of the sequence of vectors to form a final vector; and determining by a softmax layer of the classification model, at least one target class of the one or more queries based on the final vector and outputting a response to the one or more queries based on the determined target class, wherein a Square root Kullback-Leibler divergence (KLD) Loss Function is applied to the sequence of vectors to optimize the classification model.

In an embodiment, the instructions which when executed by the hardware processors may further cause determining, during training of the BiLSTM-Siamese network based classifier, one or more errors pertaining to a set of queries, wherein the one or more errors comprise one or more target classes being determined for the set of queries; generating a set of misclassified query-query pairs based on the one or more errors; and iteratively training, the Siamese model using the set of misclassified query-query pairs along with one or more correct pairs for determining a target class and outputting responses for one or more subsequent queries, wherein one or more weights of the Base network are shared with the Siamese model and the Classification model during the training of the BiLSTM-Siamese network based classifier.

In an embodiment, the instructions which when executed by the hardware processors may further cause obtaining, using the one more shared weights, a plurality query embeddings by passing the one or more queries through the Siamese model; applying a contrastive divergence loss on the plurality of query embeddings to optimize the Siamese model; and updating one or more parameters of the BiLSTM-Siamese network based classifier. In an embodiment, wherein the step of applying a contrastive divergence loss comprises: calculating, Euclidean distance between the plurality of query embeddings; and computing the contrastive divergence loss based on the calculated Euclidean distance.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
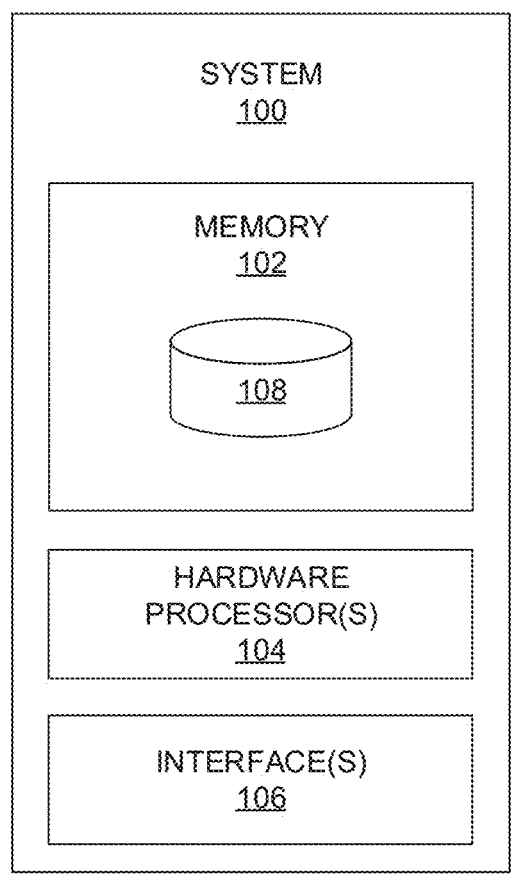
FIG. 1 illustrates an exemplary block diagram of a Bidirectional Long-Short Term Memory (BiLSTM)-Siamese network based classifier system for identifying target class of queries and outputting responses thereof in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Typically, companies have large number of employees spread across geography. It is not surprising for the HR department of such a large organization to be constantly flooded with questions, ranging from the mundane to the unanswerable. It is therefore a department that actively looks for automated assistance, especially to alleviate the burden of routine, but time-consuming tasks. The embodiments of the present disclosure provide BiLSTM-Siamese Network based Classifier for identifying target class of queries and thereby providing responses to queries pertaining to the identified target class, which acts as an automated assistant that alleviates the burden of answering queries in well-defined domains, for example, but are not limited to, leave management, and health insurance. In the arena of automated assistants, this constitutes closed-domain question answering, which is known to perform better than answering queries on any topic, or open domain question answering. In fact, the embodiments of the present disclosure focus on automatically mapping a query (or question) to a frequently-asked question (FAQ) whose answer has been manually certified by the HR department. In principle, tf the FAQs and their answers are already there, it may be simply a matter of finding the "closest" FAQ and returning its answer (a simple application of finding the nearest-neighbor, using some appropriate representation of sentences). But there are difficulties. First, the FAQ is not really a single question, but several, all of which deal with the same issue, and therefore have a common answer. In itself, this would not seem to pose any undue difficulty, since matching can be extended against a single question to matching against a set of questions, and returning the answer associated with the set containing the best matching question. The real difficulty arises from the second issue: how to measure similarity of a new query (that is, one that has not been seen before) to the questions in the FAQ-classes? A simple measure based on bags-of-words usually does not work, since questions are often semantically related, and may contain only a few words in common. Consider a query like this: 'I am deputed in Hyderabad, but my Project location is Chennai. The Flexi holidays which is shown in system is according to the Chennai holiday list. Can I avail the Flexi of both the places?' (see FIG. 5). It is unlikely that any question in an FAQ-class will have any significant match simply based on a bag-of-words. Instead, what is being asked is, do flexi-leaves of one place apply to another. Thus, even if a set of FAQ classes and their answers have been curated manually, the difficulty of having to devise a semantic similarity measure that allows to decide accurately the FAQ-class of a new query still remains and is faced repeatedly.

Only using BiLSTM for classification may not be sufficient for the type of datasets that are worked upon. An additional mechanism may be required for embedding separation. With an intuition that Siamese Model as well as the classification model both individually try to drive the query embeddings apart, the embodiments of the present disclosure combine the two approaches iteratively. For this training of Siamese Model for a epochs is carried out, and then carry the same Base-Network to train the Classification Model for b epochs. This is performed iteratively until the best accuracy is observed on the validation dataset. Here, the first step (Siamese Model) ensures the model learns which sentences are similar/dissimilar semantically while the second phase of an iteration (Classification Model) learns to predict the target class of every user query. Here a and b are assumed to be hyper parameters, that were tuned for the best performance on the validation set.

Embodiments of the present disclosure achieve this by providing a BiLSTM-Siamese network based classifier (also referred hereinafter as system) for identifying target class of queries and providing responses thereof. In above example embodiment, the system correctly finds the FAQ-class for the Hyderabad-Chennai query. Incoming queries are mapped into one of a few hundred classes, each associated with an answer certified by the HR department as being a correct response to all questions in the FAQ-class.

Problem Formalization:

Training data (D) for the FAQ chatbot is available as $D=\{s_1, s_2, \ldots, s_n\}$, which is a set of query sets $s_i$. Here, each query set $s_i$ comprises of a set of semantically similar queries $X_i = \{x_1^i, x_2^i, \ldots, x_m^i\}$, and their corresponding answer $y_i$, i.e., $s_i=(X_i, y_i)$. Objective of the problem being attempted by the embodiments of the present disclosure is to predict the query set s corresponding to users' query x, such that the corresponding answer y could be shown to the users. This can also be termed as sentence classification problem given a training data D. Every query set $s_i$ is assumed to be a class in the multi-class classification problem, i.e., $s=\mathrm{argmax}_{s_i \in D} P(s_i|x)$.

Training data D for a chatbot normally contains a few hundred classes, for ease of management of these classes, they are grouped under high level categories, such as all classes related to sick leave may be grouped into one category. It was observed that the classes within a group have high degree of concept overlap.

Referring now to the drawings, and more particularly to FIGS. 1 through 8B, where similar reference characters denote corresponding features consistently throughout the figures, there are shown preferred embodiments and these embodiments are described in the context of the following exemplary system and/or method.

FIG. 1 illustrates an exemplary block diagram of a Bidirectional Long-Short Term Memory (BiLSTM)-Siamese network based classifier system 100 for identifying target class of queries and generating responses thereof in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to information pertaining to interaction of users and the system 100 comprising queries and responses, etc. In an embodiment, the memory 102 may store the modeling techniques, for example, Siamese model, classification model, and the like, which are executed by the one or more hardware processors 104 to perform the methodology described herein.

Figure 2:
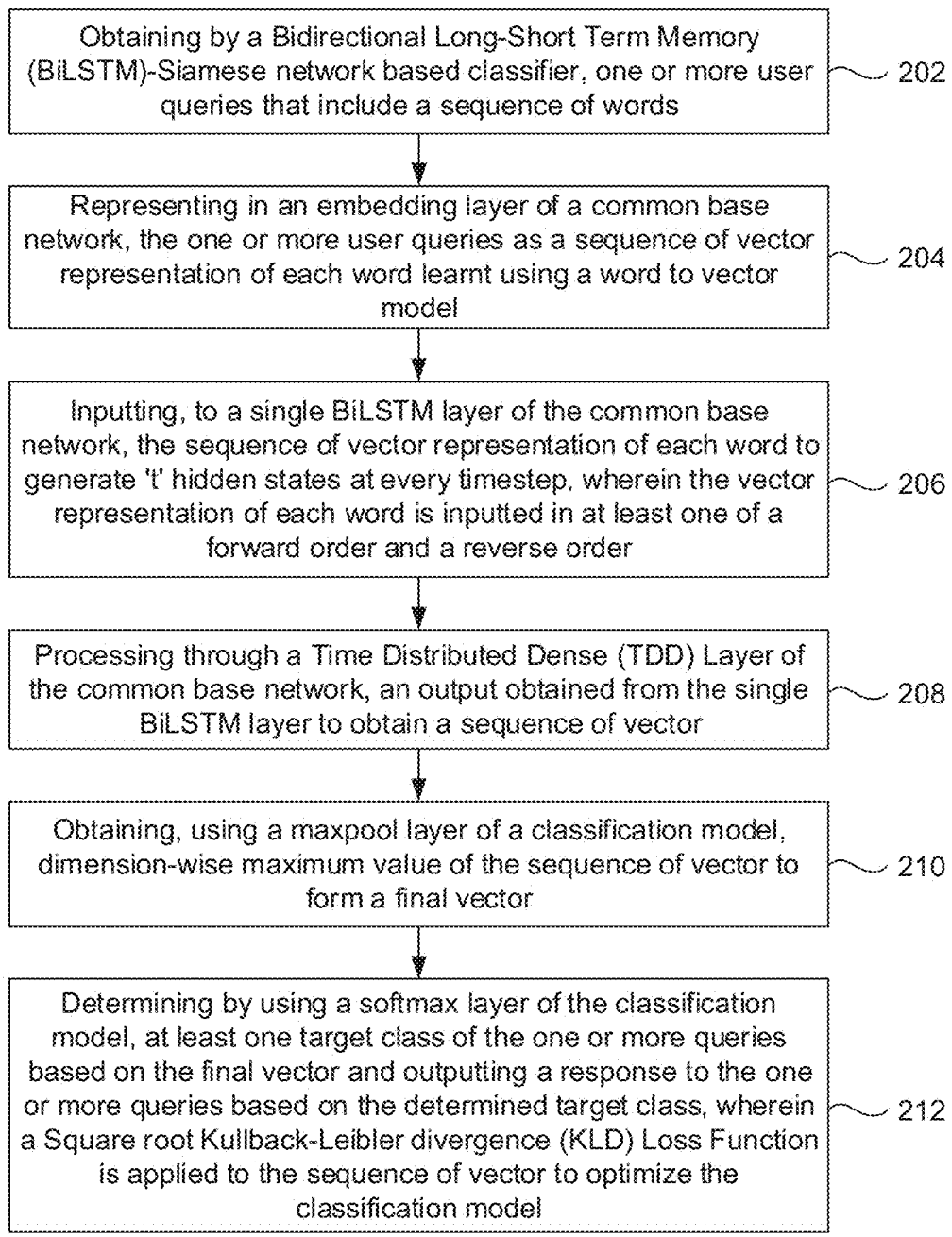
FIG. 2 illustrates an exemplary flow diagram of a method for identifying target class of queries and generating responses thereof in accordance with an embodiment of the present disclosure using the system of FIG. 1 in accordance with an embodiment of the present disclosure.
Figure 3:
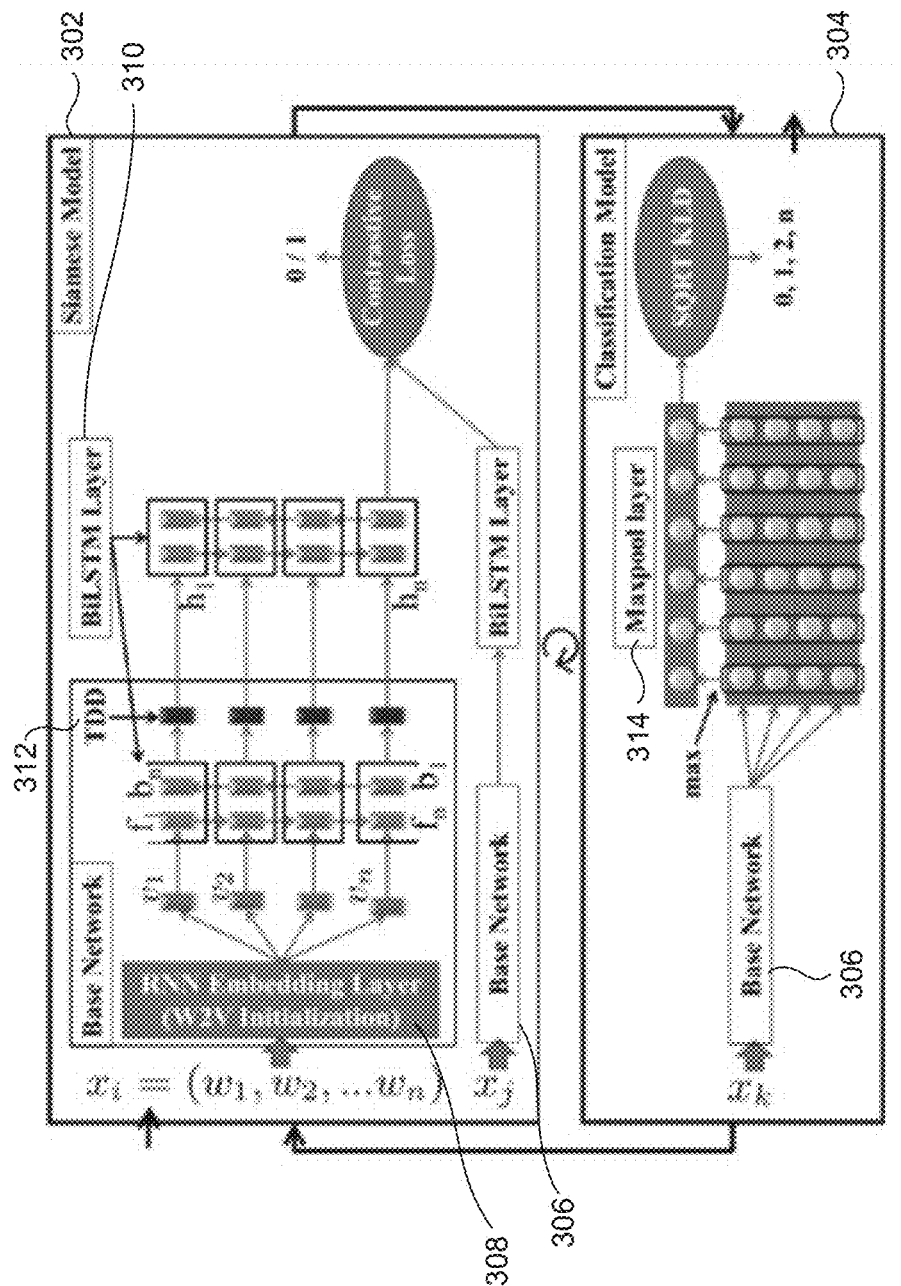
FIG. 3 illustrates an illustrative example of a Hybrid Siamese and Classification model with iterative training procedure in accordance with an embodiment of the present disclosure.

FIG. 2, with reference to FIG. 1, illustrates an exemplary flow diagram of a method for identifying target class of queries and generating responses thereof in accordance with an embodiment of the present disclosure using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The system 100 stores values (and/or parameters) associated with trained models (Siamese model and the classification model). The steps of the method of the present disclosure will now be explained with reference to the components of the system 100 as depicted in FIGS. 1 and 3, and the flow diagram of FIG. 2. In an embodiment of the present disclosure, at step 202, the Bidirectional Long-Short Term Memory (BiLSTM)-Siamese network based classifier system 100 obtains, via one or more hardware processors, one or more user queries. In an embodiment, the one or more user queries comprises of a sequence of words $x_i = (w_1, w_2 \ldots w_n)$, of varying length n. In an embodiment, the BiLSTM-Siamese network based classifier system 100 comprises a Siamese model 302 and a classification model 304 as depicted in FIG. 3, and wherein each of the Siamese model 302 and the classification model 304 comprise a common base network 306 (also referred hereinafter as base network) that includes an embedding layer 308 (also referred hereinafter as recurrent neural network (RNN) embedding layer), a single BiLSTM layer 310 and a Time Distributed Dense (TDD) Layer 312. The classification model 304 includes a maxpool layer 314 followed by a softmax layer (not shown in FIGS. 2 and 3). More specifically, FIG. 3, with reference to FIGS. 1 and 2, illustrates an illustrative example of a Hybrid Siamese and Classification model with iterative training procedure in accordance with an embodiment of the present disclosure. In an embodiment of the present disclosure, at step 204, in the embedding layer 308 of the common base network the one or more user queries are represented as a sequence of vector representation of each word learnt using a word to vector model on queries, answers/responses, and related policy documents together. In an embodiment, the sequence of words is replaced by corresponding vectors and the corresponding vectors are initialized using the word to vector model, and wherein the corresponding vectors are continually updated during training of the BiLSTM-Siamese network based classifier system 100. The word to vector (also referred hereinafter as word2vec) matrix is used to initialize the weights of an initial recurrent embedding layer, which takes the one or more queries as a sequence of 1-hot encoded word vectors, and outputs the encoded sequence of word vectors $v_i$. Thus the embedding layer 308 learns the sequential representation of each user query from a sequence of its word vectors $x_k = (v_1, v_2, \ldots v_n)$. During training of rest of the model (including the system 100), weights of this layer (i.e., w2v) also gets updated via a back-propagation.

In an embodiment of the present disclosure, at step 206, the BiLSTM layer 310 of the Siamese model 302 receives the sequence of vector representation of each word as input to generate an output (one or more 't' hidden states at every timestep). In an embodiment, the vector representation of each word is inputted in at least one of a forward order and a reverse order as a result at every word in the query it retains the context of other words both on left and right hand side. LSTMs or Long Short Term Memory networks are a variant of RNNs (Recurrent Neural Networks). LSTMs are designed to mitigate the issue of vanishing gradient, which occurs when RNNs learn sequences with long term patterns. A user query returned by the Embedding layer 308, is represented as a sequence of vectors at each time-stamp, i.e., $x_i = (v_1, v_2 \ldots v_n)$, which is the input for the BiLSTM layer. The output of LSTM unit is controlled by a set of gates in, $\mathbb{R}$ as a function of the previous hidden state $h_{t-1}$ and the input at the current time step $v_t$ as defined below:

Input gate, $i_t = \sigma(\theta_{vi} v_t + \theta_{hi} h_{t-1} + b_i)$

Forget gate, $f_t = \sigma(\theta_{vf} v_t + \theta_{hf} h_{t-1} + b_f)$ output gate, $o_t = \sigma(\theta_{vo} v_t + \theta_{ho} h_{t-1} + b_o)$ Candidate hidden state, $g_t = \tanh(\theta_{vg} v_t + \theta_{hg} h_{t-1} + b_g)$ Internal memory, $c_t = f_t \oplus c_{t-1} + i_t \oplus g_t$ Hidden state, $h_t = o_t \oplus \tanh(c_t)$ (1)

Figure 4:
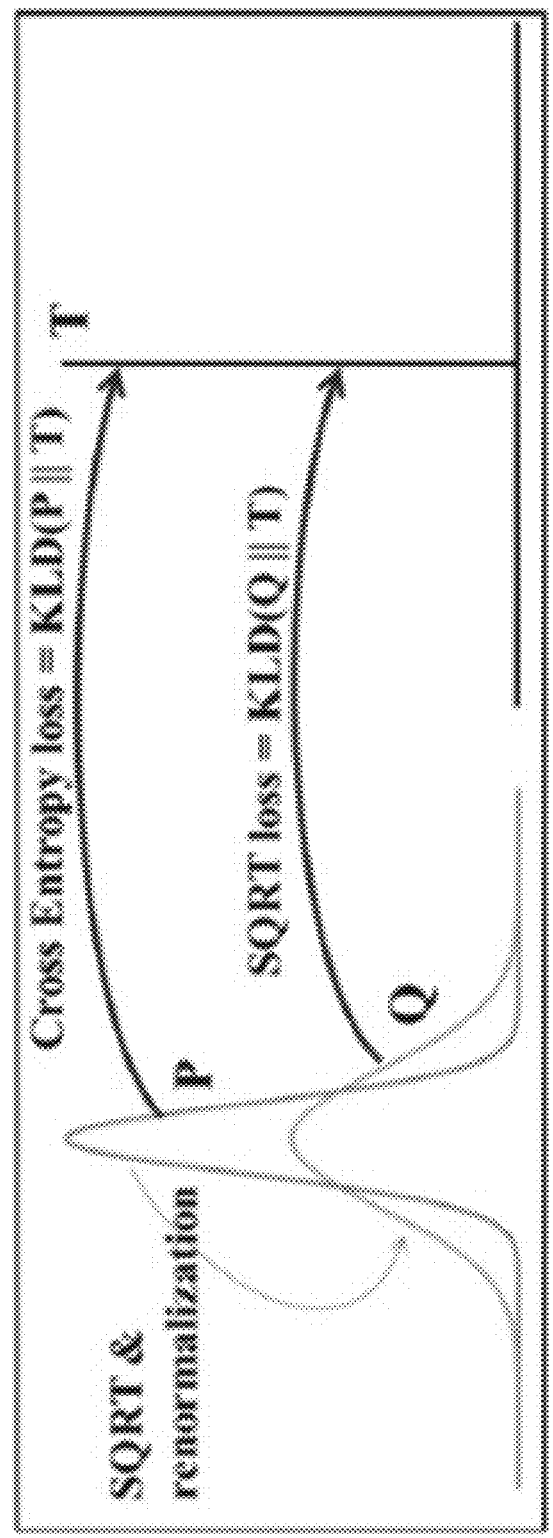
FIG. 4 is a graphical representation illustrating a predicted Probability Distribution (P), new probability distribution obtained after square-root and normalization of P, and a target distribution T in accordance with an embodiment of the present disclosure.

Here, σ is the logistic sigmoid function with output in [0,1]. tanh denotes the hyperbolic tangent function with output in [−1, 1], and ⊕ denotes the elementwise multiplication. $f_t$ can be viewed as a function to decide how much information from the old memory cell is going to be forgotten, $i_t$ to control how much new information is going to be stored in the current memory cell, and $o_t$ controls output based on the memory cell $c_t$. Bidirectional LSTM layers (BiLTSM) 310 are used for classification model 304 as depicted in FIG. 4. As mentioned above, the sequence is given as input in forward and reverse order, as a result at every word in the query it retains the context of other words both on left and right hand side.

In an embodiment of the present disclosure, at step 208, the output is sent (or processed) through the Time Distributed Dense (TDD) Layer 312 of the common base network 306 to obtain a sequence of vector. In an embodiment of the present disclosure, at step 210, the maxpool layer 314 of the classification model 304 obtains or takes dimension-wise maximum value of the sequence of vector to form a final vector. In an embodiment, the classification model 304 uses the above common base network 306 to obtain T hidden states, one at every time-step. These hidden states are passed through the maxpool layer 314 that acts as a sort of an attention layer of the network and identifies the most important semantic features of the one or more queries. In an embodiment, this maxpool layer 314 takes dimension-wise maximum value to form a final vector.

In an embodiment of the present disclosure, at step 212, a softmax layer of the classification model 304 determines at least one target class of the one or more queries based on the final vector formed and outputs (or provides) a response to the one or more queries based on the determined target class. In an embodiment, the system 100 provides response from one or more pre-defined responses stored in the database 108. In an embodiment, a Square root Kullback-Leibler divergence (KLD) Loss Function is applied to the sequence of vector to optimize the classification model 304. In an embodiment, the crossentropy loss function can be seen as KLdivergence between predicted discrete probability distribution P $$P\left(\frac{y_j}{x_i}\right), \forall j \in \{1, 2, \ldots n\}$$

and the target distribution $$T\left(\frac{y_j}{x_i}\right),$$

which is an indicator function with value 1 for the right class, and zero otherwise. These are represented as $P_i$ and $T_i$ correspondingly, i.e., $$KLD(T_i \| P_i) = \sum T_i \log\left(\frac{T_i}{P_i}\right).$$

In $T_i$ all the other terms except the target class reduce to zero, as a result it reduces to $$-\log\left(\frac{y_i}{x_i}\right).$$

which is the known crossentropy loss.

With a view to force the network to learn better separation of the embeddings (query embeddings), the above loss may be increased slightly for all predictions, i.e., irrespective of whether the prediction is right or wrong. For this, a square-root of all the probabilities in the prediction distribution $P_i$ and then re-normalize to obtain the new probability distribution $Q_i$. $Q_i$ has higher entropy than $P_i$, as depicted in FIG. 4. More specifically, FIG. 4 is a graphical representation illustrating a predicted Probability Distribution (P), new probability distribution obtained after square-root and normalization of P, and T is the target distribution in accordance with an embodiment of the present disclosure. As can be seen from FIG. 4, probability of high likely classes reduces, and the probability of low likely classes increases slightly. Instead of using the standard categorical_crossentropy loss, $KLD(T_i \| Q_i)$ which in the case of a deep network, this is equivalent to scaling the activations input to the final softmax layer by half. As it can be observed from the evaluation results presented in Tables 1, 2 and 3, this proposed approach helps achieve better accuracy on BiLSTM classification as well as when attached to Siamese network iteratively (explained later in this section). This suggests that such an artificial increase of loss helps with better separation of the query embeddings. A similar technique was used by a conventional approach wherein the conventional approach took square of the predicted distribution and assumed it as auxiliary target distribution for clustering in unsupervised setting, while embodiments of the present disclosure and the proposed approach take square-root of the predicted distribution and use it to increase the loss, in the context of classification.

On the above model it was observed that many of the user queries belonging to a class frequently get misclassified. In order to improve classification accuracy, in every iteration after running the classification model 304, a pairs of frequently misclassification queries were identified, i.e., if many queries of a class are frequently predicted to be in another class in the validation dataset. In other words, during training of the BiLSTM-Siamese network based classifier, one or more errors pertaining to a set of queries were determined, wherein the one or more errors comprise one or more target classes being determined for the set of queries, based on which a set of misclassified query-query pairs were generated. The Siamese model was then iteratively trained using the set of misclassified query-query pairs along with one or more correct pairs for determining a target class and outputting responses for one or more subsequent queries. As a result the Siamese model 302 attempts to drive the corresponding query embeddings apart and it becomes comparatively easier for the classification model 306 to classify such queries accurately, leading to better accuracy as described below. Here, the fact that the Siamese Model 302 works on a pair of queries at a time is leveraged which helps to drive the embeddings of queries of these classes apart in every iteration. In an embodiment, one or more weights of the Base network are shared with the Siamese model and the Classification model during the training of the BiLSTM-Siamese network based classifier. The Siamese model 302 takes many different pairs of queries $\{x_i, x_j\}$, some of which belong to the same class, while others belong to different classes, i.e., given a pair of queries, the objective of the system 100 is to predict whether they belong to the same class $\{1\}$ or not $\{0\}$. As a result, using the one more shared weights, a plurality query embeddings are obtained by passing the one or more queries through the Siamese model 302 (e.g., same neural network architecture), wherein a contrastive divergence loss is applied on the plurality of query embeddings for updating one or more parameters of the BiLSTM-Siamese network based classifier system 100 (or the neural network) via back-propagation and thereby optimizing the Siamese model. The Siamese model/network 302 contains base network followed by single layer of BiLSTM from where the final state is taken as the embedding of the input query. The BiLSTM layer 310 (which is the penultimate layer of the Siamese model 302 returns the query embeddings $e^s(x_i)$ and $e^s(x_j)$ for each of the queries $\{(x_i, x_j)\}$. At first, Euclidean distance $D_s$, between the plurality of query embeddings, $e^s(x_i)$ and $e^s(x_j)$ is calculated, and the contrastive divergence loss is computed (or calculated) based on the calculated Euclidean distance, which is illustrated by way of an expression below $$L(s_i, s_j, C_i) = C_i * (D_s) + (1 - C_i) * \max(0, m - D_s) \quad (2)$$

Here, $C_i \in \{0,1\}$ is the target class for the pair of queries. When the two queries belong to the same class ($C_i=1$), first term becomes active and the $D_s$ itself becomes the loss and the network would try to reduce the distance between the embeddings. When the two queries belong to different classes ($C_i=0$) the second term of expression (2) becomes active, and if the distance between the embeddings is more than the margin m the loss term becomes zero, otherwise the loss is $(m-D_s)$, i.e., it tries to drive the embeddings apart. Effectively, it brings the embeddings of similar queries together and pushes embeddings of dissimilar queries apart by at-least margin (m) distance. Here, the pairs are sampled such that the ratio of positive pairs (belonging to same class) and negative pairs (belonging to different class) is 1:2. The Negative pairs are sampled such that the queries have highest Jaccard similarity between each other. Schematic diagram of the Siamese Model 302 is shown in the upper rectangle of the FIG. 3.

Model Evaluation Results:

Table 1 depicts general statistics of the three datasets (Leave, Health Insurance Scheme (HIS) and 20Newsgroups) used for carrying out all the evaluations. It also shows the data splits used for training, validation and test data, along with the average length of sentences and the number of classes in each dataset. HIS and Leave chatbot data set are split into training-validation-test sets in the ratio 60-20-20.

TABLE 1

| Property | Leave | HIS | 20Newsgroups |
|---|---|---|---|
| Train data | 2801 | 4276 | 7507 |
| Validation data | 934 | 1426 | 787 |
| Test data | 934 | 1426 | 5415 |
| Average sentence length | 62 | 73 | 429 |
| No. of classes | 199 | 117 | 4 |

20Newsgroups (20NG):

It consists of documents from 20 newsgroups. Bydate version was used and four major categories were selected (comp, politics, rec, and religion). Standard split of 20NG data was used in training and test sets. In addition, 10% of the training data was used as validation set. An early stopping criteria was employed based on validation loss of classification model.

Figure 5:
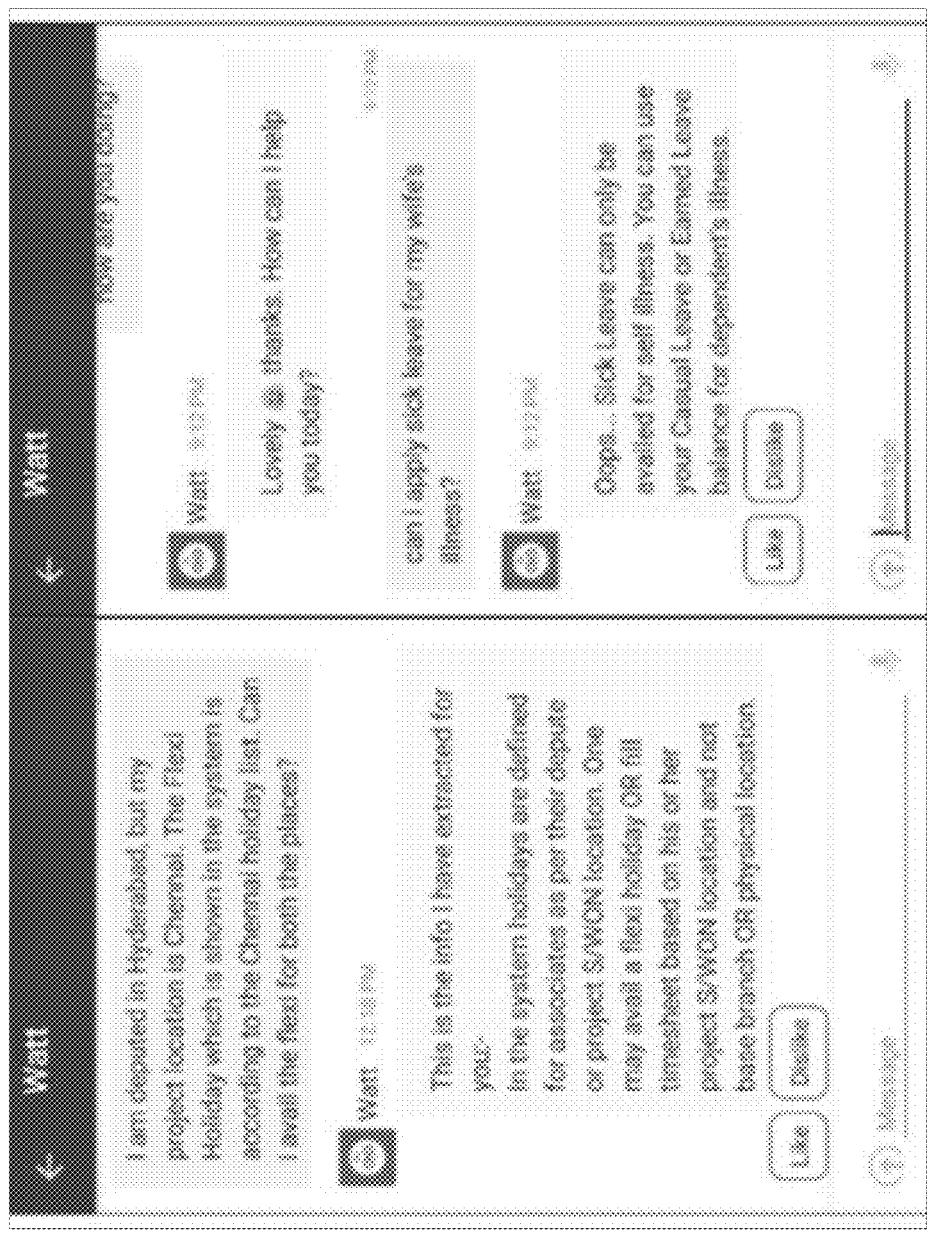
FIG. 5 depicts a chatbot, called 'Watt', which answers questions on Leave and Health Insurance Scheme (HIS) related policies in accordance with an example embodiment of the present disclosure.
Figure 6:
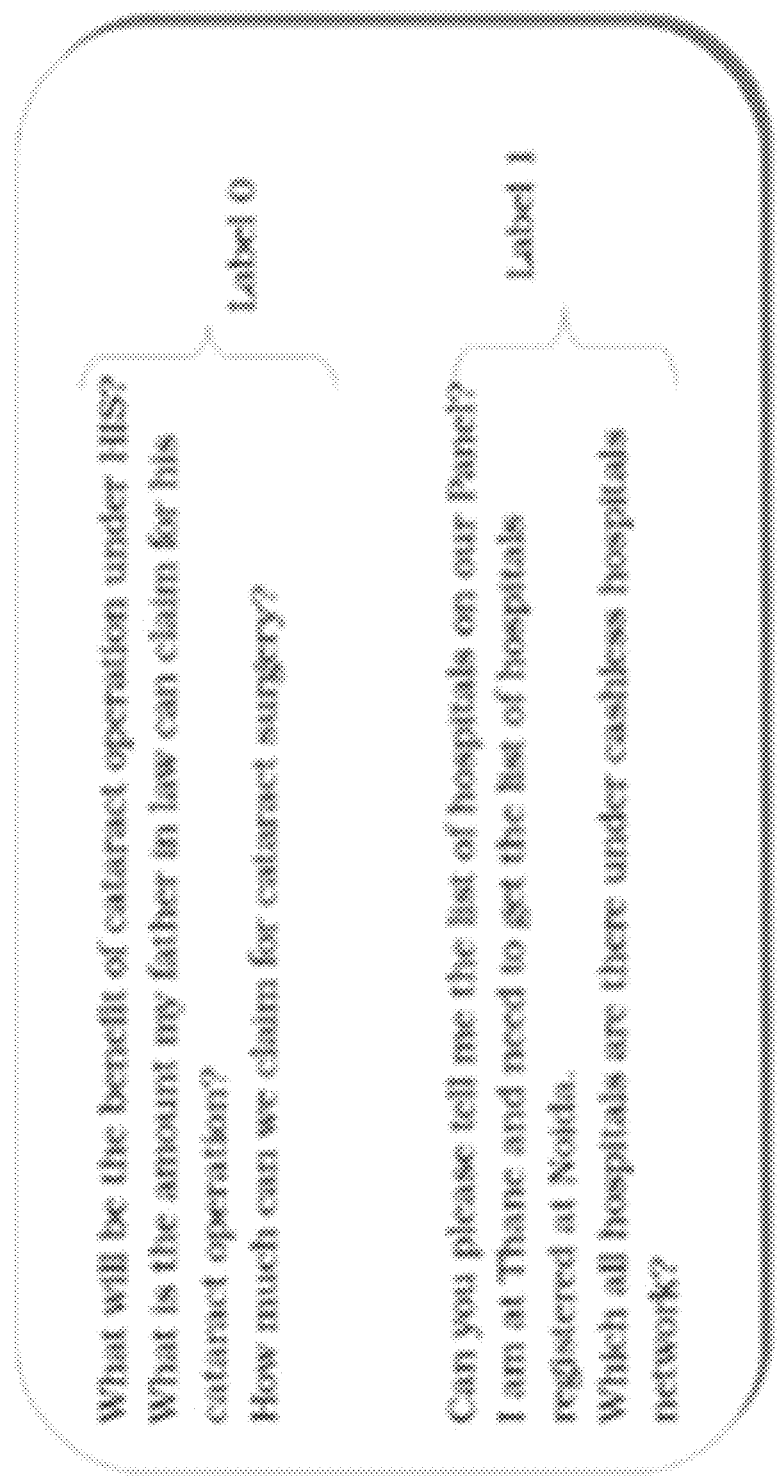
FIG. 6 illustrates sample queries from Health Insurance Scheme dataset depicting similar queries form one cluster according to an embodiment of the present disclosure.

Details and sample questions of the HR chatbot data are given below:

Large organisations typically have elaborate human resource policies for employee benefits. Such policies are usually described in large documents which are often hard to read. Employees either rely on the wide-spread perception of these policies or seek assistance from human resource officers, which works as a deterrent in large organisations, especially when queries reveal personal information, such as pregnancy or illness. The goal of the embodiments of the present disclosure in developing a digital assistant was to both ensure that employee queries remain confidential, and that it provides precise assistance in the form of curated answers rather than mere pointers to a voluminous policy document. The system 100 for identifying target class of queries and providing responses thereof (e.g., FAQ assistant for HR-policy queries) was developed and integrated into this environment as a 'chatbot'. FIG. 5, with reference to FIGS. 1 through 4, depicts a chatbot, called 'Watt', which answers questions on Leave and Health Insurance Scheme (HIS) related policies in accordance with an example embodiment of the present disclosure. FIG. 6, with reference to FIGS. 1 through 5, illustrates sample queries from Health Insurance Scheme dataset depicting similar queries form one cluster according to an embodiment of the present disclosure.

To create the initial FAQs as well as training set, a task force comprising of human resource domain experts was formed and given its separate collaboration group (called 'Teachers of HR Bots'). This team first created many sets of similar questions, each referred to as a query set, where all the questions in a query set being such that they could be served by a single answer. Next, answers were curated by the teachers, by carefully reading the policy documents as well as deliberation and discussion. 199 such query-sets were created for Leave policies and 117 for HIS policies. In the process the teachers ended up creating 10,000 distinct questions.

After the creation of seed data as above, first version of the system (also referred hereafter as chatbot) was deployed/implemented and subsequent training and data creation was done from the chatbot interface itself, using command-line instructions. Thus it was possible to train the chatbot by giving the right query set id in the event that the prediction made was wrong; such feedback continuously produces additional training data using which the HSCM-IT classifier is periodically re-trained. During the training time, in case a wrongly classified questions is repeated almost verbatim in between re-training intervals, the correction initially provided via trainer feedback is returned instead of the classifier output, thus giving the illusion of continuous learning.).

Data Preprocessing:

These queries before they were fed into the system 100 were preprocessed in the following steps: i) Queries were converted to their lower case, the system was made case-insensitive by doing this step, ii) Removal of special characters from text, and iii) Capturing all abbreviations and replacing them with their actual meaning, e.g., ml is replaced by maternity leave, sml by special maternity leave. There was no stop-words removal as it was observed that removing certain words from the text leads to a slight deterioration in the performance of the classifier and hence it was concluded that all the words are required for a better prediction accuracy.

Word Distribution Vectors:

After preprocessing the text the word2vec was learnt using skip gram algorithm/technique. All the policy documents, chatbot answers as well as questions of all the query sets were used for learning these domain specific vector representations of all words. General purpose GLOVE word embeddings learned on the English Wikipedia® data was also tried, however it was observed that domain specific word embeddings render better accuracy. It could be because of many a domain specific terms or orthogonal meanings of the words such as "Leave".

Training Details:

The Base network and its weights were shared in both branches of Siamese model and in the classification model. We also performed grid search for hyper-parameters of the network namely, no. of hidden units in range {100-350} with a step-size of 50 units, batch-size in range {20, 40, 64, 128}, and the learning rate in range {0.1, 0.01, 0.001, 0.0001}, and obtained the best set of parameters as chosen on the validation set. Finally, on the best choice of hyper-parameters every model was trained 'x' times (say 10 times), with different initializations and observed the average accuracy/F1-Score on the unseen test dataset. Best results with 250 hidden units of base network for HIS and 300 for Leave data, while with 150 hidden units on 20NG dataset were obtained. Batchsize of 64 gave the best results on all the datasets. Optimizer gave the best results on all the datasets with a default learning rate of 0.001. Finally, hyper-parameters a and b were also tuned for the best results on the validation set and it was found that HSCM-IT performed the best for a=5 and b=10.

Regularization:

LSTMs require a lot of training data and have huge number of parameters, as a result they tend to over-fit the training data easily, to prevent that techniques for example, including early stopping, L1/L2 regularization (weight decay) and batch normalization were used by the system 100. Batch normalization is a fairly recent technique that has been able to reduce internal covariate shift in the distribution of the inputs to the model. It has also resulted in faster convergence and better generalizations of the RNNs.

Progression to Hybrid Model (HSCM):

The performance of proposed technique HSCM-IT(F), with a TF-IDF classifier which follows a bag-of-word approach (A) was compared. The main objective of other results reported is to progressively compare the performance of individual components of HSCM-IT, with that of itself. The components being compared are: (B) Bidirectional LSTM with 2 layers, (C) Classification Model, and (D) Siamese Model, (E) HSCM without iterative training procedure. These results have been reported in Table 2 for chatbot datasets and in Table 3 on 20NG public dataset. On all these models we also report the benefits of using the SQRT-KLD loss, i.e., on all of (B), (C) and (D) two evaluations were carried out, one with crossentropy loss function and another with SQRT-KLD loss function. More particularly, Table 2 depicts average accuracy (over 10 runs) comparison between baseline techniques and proposed technique(s)/proposed algorithm HSCM, with two loss functions Crossentropy and SQRT-KLD, on chatbot datasets. * indicates 1 run only in Table 2. Table 3 depicts average F1-Score (over 10 runs) comparison, on 20NG dataset.

TABLE 2

|   | Algorithm/Technique | HIS | Leave |
|---|---|---|---|
| A | TF-IDF, 1-NN, Cosine Sim | 79.80 | 58.35 |
| B | BiLSTM + X entropy | 85.09 | 83.15 |
|   | BiLSTM + SQRT-KLD | 87.23 | 83.48 |
| C | Classi. Model + X entropy | 86.26 | 83.44 |
|   | Classi. Model + SQRT-KLD | 89.76 | 83.78 |
| D | Siamese Model + 1-NN | 72.15* | 63.85* |
| E | HSCM + SQRT-KLD | 89.19 | 83.44 |
| F | HSCM-IT + X entropy | 89.12 | 83.87 |
|   | HSCM-IT + SQRT-KLD | 90.53 | 84.93 |

TABLE 3

|   | Algorithm/Technique | 20NG |
|---|---|---|
| A | TF-IDF, 1-NN, Cosine Sim | 90.20 |
| B | BiLSTM + X entropy | 93.56 |
|   | BiLSTM + SQRT-KLD | 94.26 |
| C | Classi. Model + X entropy | 93.79 |
|   | Classi. Model + SQRT-KLD | 94.22 |
| F | HSCM-IT + X entropy | 94.87 |
|   | HSCM-IT + SQRT-KLD | 95.12 |

TF-IDF Based Classification:

The performance of the TF-IDF classifier was first evaluated, which is based on bag of-word approach, indicating how many times characteristic words of every class are present in the data. For this, first the TF-IDF vector for every query-set as well as for the user query (which needs to be classified) was calculated, and then the target class was found using first nearest neighbor, using cosine similarity as the distance measure. The results indicate that 20NG dataset has many more class characteristic words, than the HIS and Leave datasets. This is also because the number of classes in chatbot datasets is much higher than the 20NG dataset. On HIS and Leave data a maximum gain of ~11%, ~26% in accuracy was observed by using HSC model as compared to the TF-IDF model, while on 20NG the corresponding gain in F1-Score was observed to be ~6% only. Pair-wise Jaccard similarity of sentences in the three datasets was calculated, and it was observed that average inter-class Jaccard similarity in 20NG is 0.0911, and in HIS and Leave it is 0.1066 and 0.1264, respectively. This also indicates that HIS and Leave datasets are harder to classify.

Deep Classification model with BiLSTM: For the problem given in above description, the first obvious choice that one can make is use of RNNs as it involves sequential data. The embodiments of the present disclosure therefore used (B) Bidirectional LSTMs as a starting point for the problem. A small gap between TD-IDF and BiLSTM in 20 NG indicates that the classes that were chosen were fairly orthogonal, while on the other hand the gap increased in HIS data and was the maximum in Leave data which highlights the fact that it is indeed the hardest data amongst all three.

Classification Model:

This model uses an additional maxpool layer for attention. It can be observed that this model alone performs almost equal to (B) on leave and 20NG dataset, while a small gain was observed in HIS dataset. D) Siamese Model with 1-NN: Accuracy of the Siamese model alone was also measure, with the 1-NN classifier using euclidean distance between the embeddings of users' query x, and the embeddings of the queries present in training data $x_i \in D_{train}$. It can be observed that the accuracy of this model is worse (or not good) than the BiLSTM model itself.

Hybrid Models:

E) HSCM & HSCM-IT: Finally, as it can be observed that the Hybrid model (E) HSCM+SQRT-KLD does not perform better than the Classification Model itself. The proposed approach (F) HSCM-IT by the system 100 performs better than all the other approaches (A to E) on all the datasets (HIS, Leave and 20NG), however with a slight margin sometimes. These results empirically prove that it is the iterative training procedure of the hybrid model that brings the key benefit over other approaches, and helps drive apart the embeddings of dissimilar queries. Here, frequently misclassified pairs of queries were included, observed on validation data and taken from training data, in the Siamese training in every iteration.

Benefit of SQRT-KLD Loss:

Across all the three datasets and all deep-learning approaches a consistent pattern was observed that SQRT-KLD has lead to gain in accuracy/F1-Score over the crossentropy loss. Gain in F1-Score on 20NG dataset is consistently ~1%, while the gain in accuracy by using this loss function in HIS dataset is about 2-3%, and in Leave dataset this gain is small.

Figure 7:
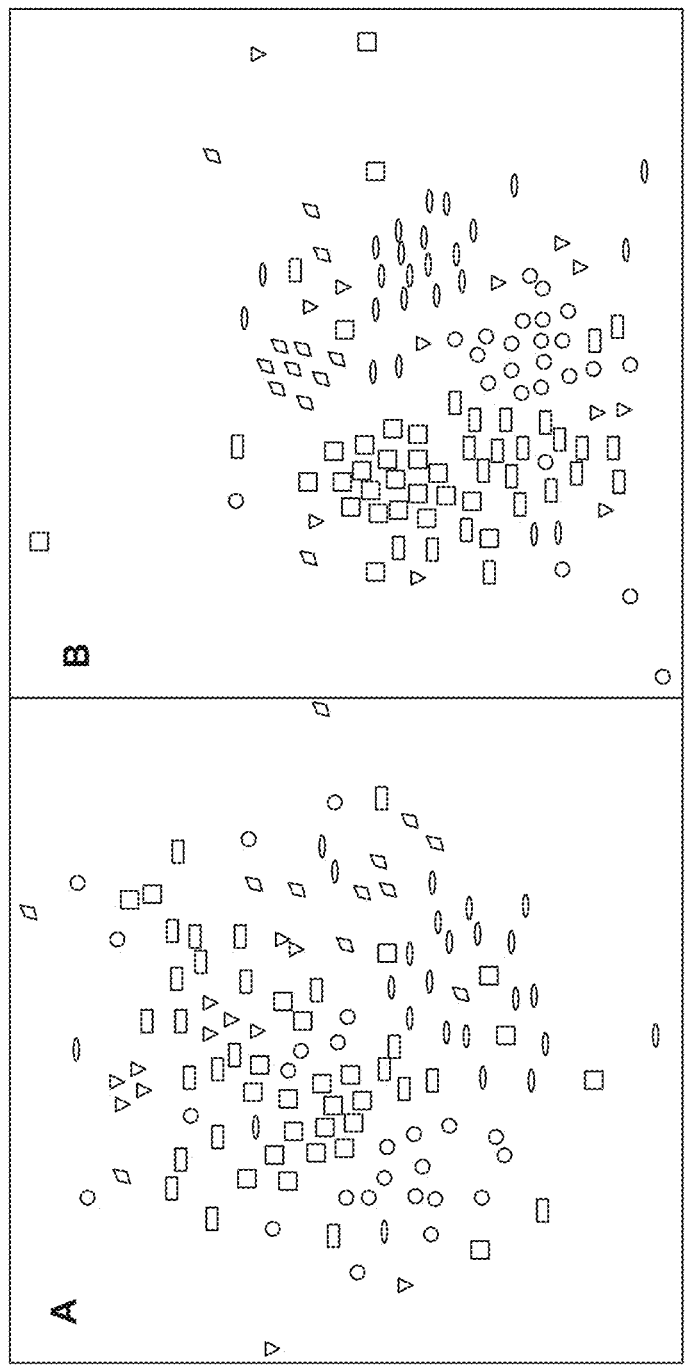
FIG. 7 depicts (A) BiLSTM embedding and (B) HSCM-IT embeddings obtained in a classification model of the system of FIGS. 1 and 2 according to an embodiment of the present disclosure.

Embedding Separation:

To illustrate how HSCM-IT algorithm/technique helps drive the query embeddings away from queries of other classes, reverse otherwise, a subset of classes was taken from HIS dataset. The classes in HIS and Leave dataset were organized into a number of categories, e.g., all classes related to sick leave were bucketed into same category, or all classes related to Health Insurance Premium were grouped into one category. Classes within a category are found to have many overlapping concepts, making it hard to classify accurately. Embeddings of the training data belonging the classes of the same category were taken and used T-SNE dimensionality reduction technique to visualize the degree of separation. One such sample comparison is shown in FIG. 7. More particularly, FIG. 7 depicts (A) BiLSTM embedding and (B) HSCM-IT embeddings obtained in the classification model 306 of the system 100 of FIGS. 1 and 2 according to an embodiment of the present disclosure Here, queries of the same class share the same shape (e.g., circle, square, rectangle, inverted triangle, diamond shape, and eclipse shape). For example, all circles depicted in FIG. 7 correspond to class 'm' only. Likewise, all squares depicted in FIG. 7 may correspond to class 'n' only.

Baseline Comparison:

The most similar algorithm to proposed approach of finding Query-Query similarity for classification of users' query to retrieve the answers, is RCNN technique. Performance of the proposed technique/algorithm was compared with the RCNN technique on chatbot datasets as well as on 20NG. Results shown in Table 4 are based on proposed implementation of the same algorithm. Here, it can be observed that HSCMIT performs better than RCNN by 3% on HIS data, and with 1% on Leave data.

TABLE 4

| Algorithm | HIS (Accuracy) | Leave Accuracy | 20NG (F1-Score) |
|---|---|---|---|
| RCNN | 87.31 | 83.30 | 96.69*/94.38 |
| HSCM-IT + SQRT-KLD | 90.53 | 84.93 | 95.12 |

Figure 8A:
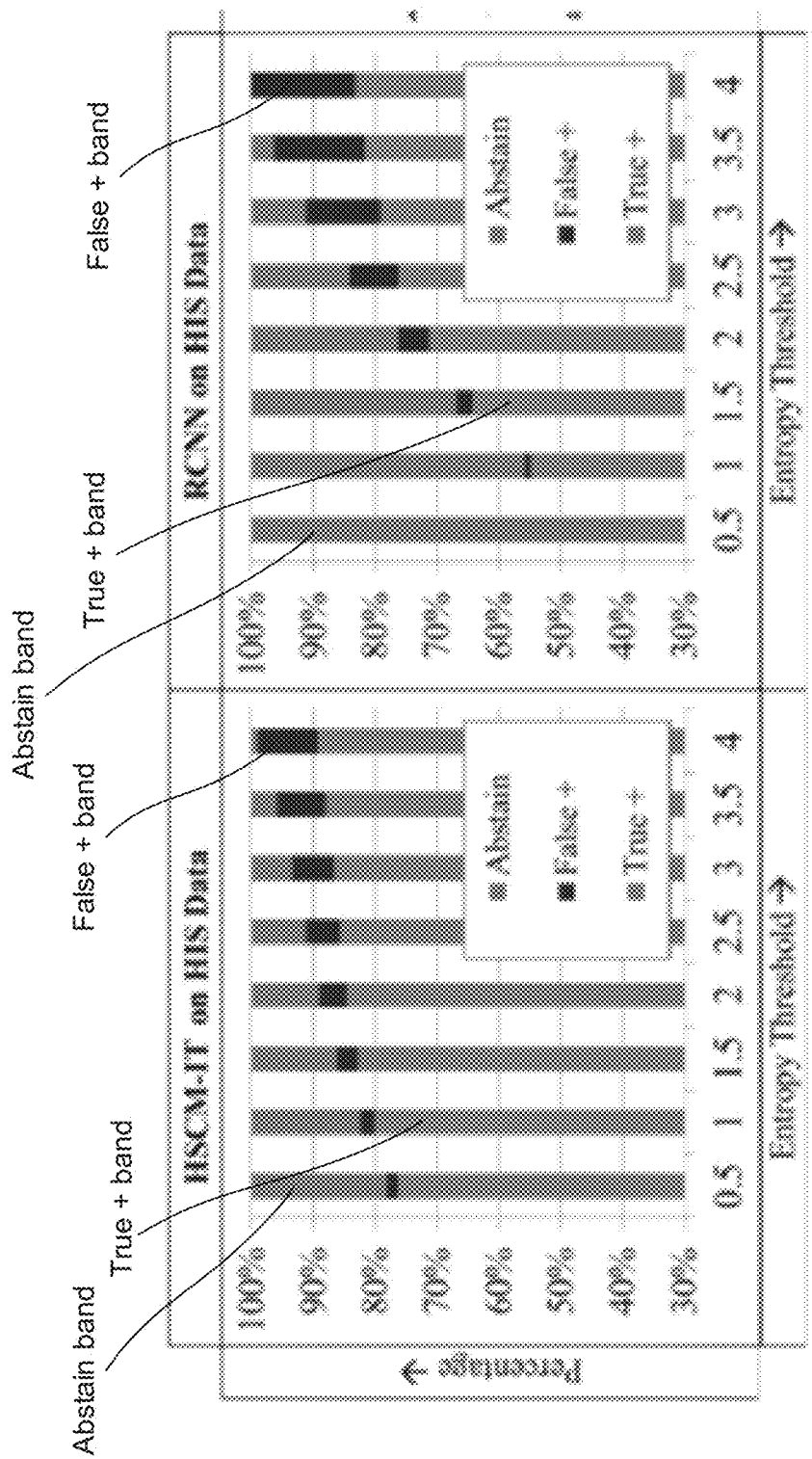
FIG. 8A-8B depict graphical representations illustrating variation of True positive, Abstain, and False positive categories with respect to entropy threshold in accordance with an embodiment of the present disclosure.
Figure 8B:
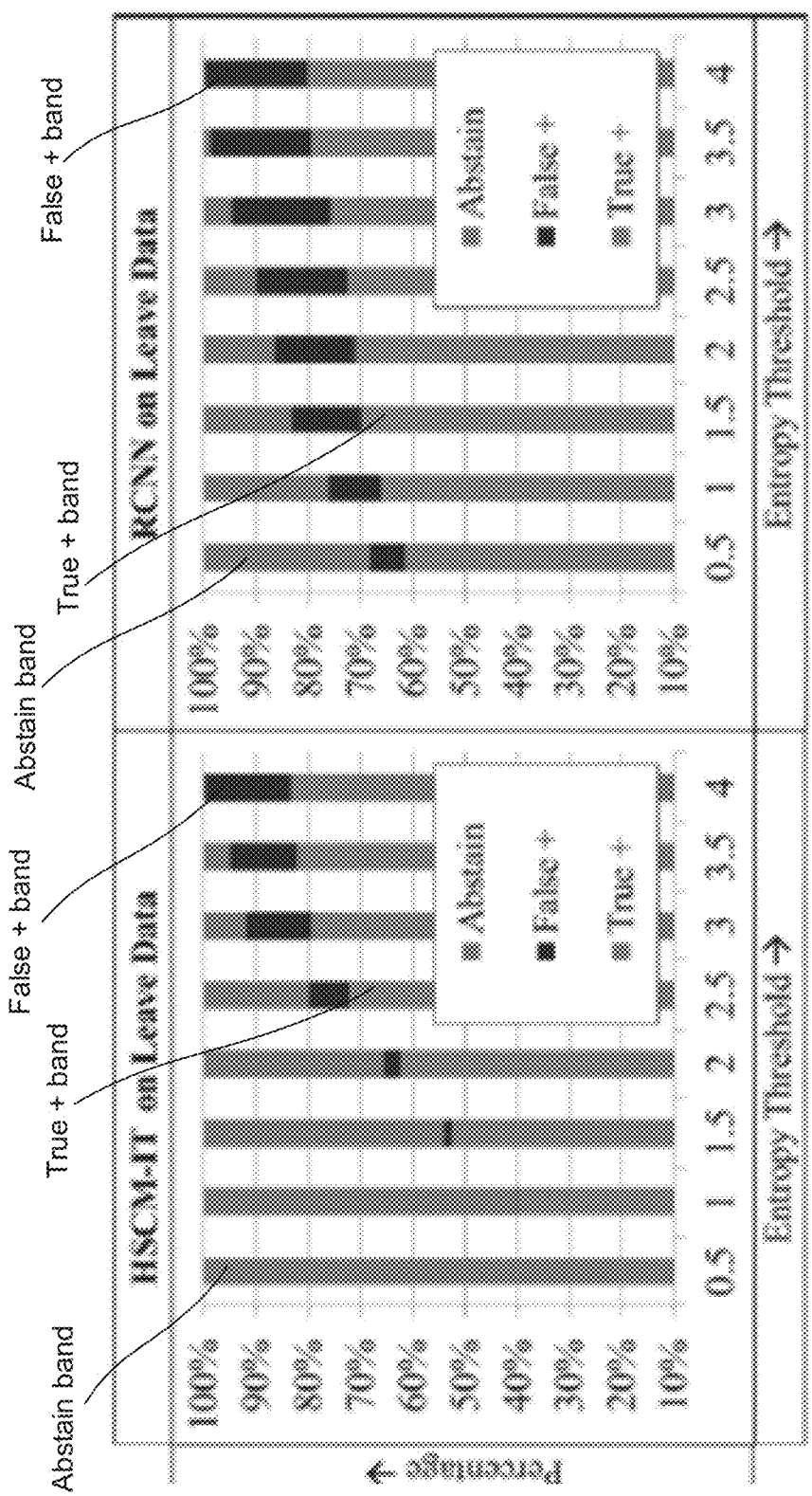

Deployment Results:

While deploying a machine-learning based question answering system for human consumption, it is important in practice that the system attempts to either answer their query correctly or abstains from answering instead of giving wrong answers, as far as possible. We use the entropy of the discrete probability distribution predicted by our Model HSCM-IT to decide whether to abstain: If the entropy is higher than a chosen threshold τ, the system abstains from answering and instead routes the user to a human responder. To analyze performance in this setting the predictions of the model are divided in three categories: True-Positive (or True+band), False-Positive (False+band), and Abstain (or Abstain band). A plot for varying values of τ is shown in FIGS. 8A and 8B, for both HIS and Leave datasets respectively. More particularly, FIGS. 8A and 8B, with reference to FIGS. 1 through 7, depict graphical representations illustrating variation of True positive, Abstain, and False positive categories with respect to entropy threshold in accordance with an embodiment of the present disclosure. A suitable entropy threshold can be identified such that the levels of False-Positives and Abstain cases are kept within tolerable levels, without significant drop in True-Positives. It can be observed from FIG. 8A-8B that the band (indicating False+) is comparatively narrower in HSCM-IT than in RCNN plots (especially above 80% True+). This suggests that HSCM-IT model is more deployable in practice than the RCNN model. It can be speculated that the higher precision of the proposed HSCM-IT model can be attributed to embedding separation, which was one of its key objectives. Using the best case true-positive ration it can be estimated that after the deployment of such chatbots the daily load on the HR department for answering policy-related queries should drop from the current 6000 levels to less than 1000.

Last but not least, it is noted again that for every query the system 100 first decides whether the query is about insurance or leave policy. Same model (HSCM-IT) is used to classify the users' query into two categories 'HIS', 'Leave', which was observed to have very high accuracy (>96%).

Embodiments of the present disclosure provide a Bidirectional Long-Short Term Memory (BiLSTM)-Siamese network based classifier system and method for identifying target class of queries and providing responses thereof which acts as a natural language assistant to automatically answer FAQs. The system 100 introduces a new loss function SQRT-KLD usable within softmax layer of a neural network. The embodiments have also demonstrated an efficacy of the methodology through empirical evaluations, and have shown that it performs better than a baseline approach on public as well as on real-life datasets. From the experimental evaluation and results it is a clear indication that HSCM-IT model has better precision-recall tradeoff than the baseline technique, leading to a more deployable algorithm in practice. Additionally the system 100 may reside (or is capable of residing or resides) on a dedicated hardware or a computer system which comprises of (or resides on) a Graphical Processing Unit (GPU), specifically utilized for machine learning or deep learning algorithms. Unlike conventional computer systems, the system 100 comprises of the GPU with high end data processing components (e.g., as high as 1000 to 10000 cores), wherein the system 100 processes of large volume of data and at the same time reduces the processing time of the queries, and further the system 100 is trained on the GPU to improvise on accuracy thereby optimizing the Siamese model 302 and the classification model 304.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, BLU-RAYs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   obtaining by a Bidirectional Long-Short Term Memory (BiLSTM)-Siamese network based classifier, via one or more hardware processors, one or more user queries, wherein the one or more user queries comprises of a sequence of words, wherein the BiLSTM-Siamese network based classifier comprises a Siamese model and a classification model, and wherein each of the Siamese model and the classification model comprise a common base network that includes an embedding layer, a single BiLSTM layer and a Time Distributed Dense (TDD) Layer;
   iteratively performing:
   representing in the embedding layer of the common base network, the one or more user queries as a sequence of vector representation of each word learnt using a word to vector model, wherein the sequence of words is replaced by corresponding vectors initialized using the word to vector model, wherein the corresponding vectors are continually updated during training of the BiLSTM-Siamese network based classifier, wherein the word to vector model is used to initialize weights of the embedding layer which takes the one or more user queries as a sequence of 1-hot encoded word vectors and outputs encoded sequence of the corresponding vectors and wherein the weights of the embedding layer are updated through back-propagation;
   inputting, to the single BiLSTM layer of the common base network, the sequence of vector representation of each word to generate 't' hidden states at every timestep, wherein the vector representation of each word is inputted in at least one of a forward order and a reverse order and wherein the vector representation retains context of other words both on a left hand side and a right hand side as a result at each word in the one or more user queries, and an output of a LSTM unit is controlled by a set of gates as a function of previous hidden state and input at a current timestep, and computing an internal memory as a function to decide how much information from an old memory cell is going to be forgotten along with control on how much new information is going to be stored in a current memory cell, and controls output based on the internal memory;

determining, during training of the BiLSTM-Siamese network based classifier, one or more errors pertaining to the one or more user queries, wherein the one or more errors comprise one or more target classes being determined for the one or more user queries;

generating a set of misclassified query-query pairs based on the one or more errors;

iteratively training, the Siamese model using the set of misclassified query-query pairs along with one or more correct pairs, wherein one or more weights of the common base network are shared with the Siamese model and the classification model during the training of the BiLSTM-Siamese network based classifier;

processing through the Time Distributed Dense (TDD) Layer of the common base network, an output obtained from the BiLSTM layer to obtain a sequence of vector;

obtaining, using a maxpool layer of the classification model, dimension-wise maximum value of the sequence of vector to form a final vector; and determining by a softmax layer of the classification model, at least one target class of the one or more queries based on the final vector and outputting a response to the one or more queries based on the determined target class, wherein a Square root Kullback—Leibler divergence (KLD) Loss Function is applied to the sequence of vector to optimize the classification model by computing a cross entropy loss function between probability distribution of the sequence of vector and a target distribution of the sequence of vector, wherein the probability distribution is obtained by performing square root and normalization of predicted discrete probability distribution of the sequence of vector and wherein the target distribution is an indicator function with a value of one for the target class and zero otherwise.

2. The processor implemented method of claim 1, further comprising:

obtaining, using the one more shared weights, a plurality query embeddings by passing the one or more queries through the Siamese model, wherein the Siamese model attempts to drive the corresponding query embeddings apart, wherein query embeddings of similar queries are brought together and the query embeddings of dissimilar queries are pushed apart by at-least margin distance, wherein if a distance between the query embeddings is more than the margin distance then a loss term becomes zero and drives the query embeddings apart, and wherein the Siamese model works on a pair of queries at a time is leveraged which helps to drive the query embeddings apart in every iteration;

applying a contrastive divergence loss on the plurality of query embeddings to optimize the Siamese model; and updating one or more parameters of the BiLSTM-Siamese network based classifier.

3. The processor implemented method of claim 2, wherein the step of applying a contrastive divergence loss comprises:

calculating, Euclidean distance between the plurality of query embeddings; and computing the contrastive divergence loss based on the calculated Euclidean distance.

4. A Bidirectional Long-Short Term Memory (BiLSTM)-Siamese Network based Classifier system, comprising:

a memory storing instructions;

one or more communication interfaces; and one or more hardware processors coupled to the memory via the one or more communication interfaces, wherein the one or more hardware processors are configured by the instructions to:

obtain by the Bidirectional Long-Short Term Memory (BiLSTM)-Siamese network based classifier system, via one or more hardware processors, one or more user queries, wherein the one or more user queries comprises of a sequence of words, wherein the BiLSTM-Siamese network based classifier system comprises a Siamese model and a classification model, and wherein each of the Siamese model and the classification model comprise a common base network that includes an embedding layer, a single BiLSTM layer and a Time Distributed Dense (TDD) Layer;

iteratively perform:

representing in the embedding layer of the common base network, the one or more user queries as a sequence of vector representation of each word learnt using a word to vector model, wherein the sequence of words is replaced by corresponding vectors initialized using the word to vector model, wherein the corresponding vectors are continually updated during training of the BiLSTM-Siamese network based classifier, wherein the word to vector model is used to initialize weights of the embedding layer which takes the one or more user queries as a sequence of 1-hot encoded word vectors and outputs encoded sequence of the corresponding vectors and wherein the weights of the embedding layer are updated through back-propagation;

inputting, to the single BiLSTM layer of the common base network, the sequence of vector representation of each word to generate 't' hidden states at every timestep, wherein the vector representation of each word is inputted in at least one of a forward order and a reverse order and wherein the vector representation retains context of other words both on a left hand side and a right hand side as a result at each word in the one or more user queries, and an output of a LSTM unit is controlled by a set of gates as a function of previous hidden state and input at a current timestep, and computing an internal memory as a function to decide how much information from an old memory cell is going to be forgotten along with control on how much new information is going to be stored in a current memory cell, and controls output based on the internal memory;

determining, during training of the BiLSTM-Siamese network based classifier, one or more errors pertaining to the one or more user queries, wherein the one or more errors comprise one or more target classes being determined for the one or more user queries;

generating a set of misclassified query-query pairs based on the one or more errors;

iteratively training, the Siamese model using the set of misclassified query-query pairs along with one or more correct pairs, wherein one or more weights of the common base network are shared with the Siamese model and the classification model during the training of the BiLSTM-Siamese network based classifier;

processing through the Time Distributed Dense (TDD) Layer of the common base network, an output obtained from the single BiLSTM layer to obtain a sequence of vector;

obtaining, using a maxpool layer of the classification model, dimension-wise maximum value of the sequence of vector to form a final vector; and determining by using a softmax layer of the classification model, at least one target class of the one or more queries based on the final vector and outputting a response to the one or more queries based on the determined target class, wherein a Square root Kullback—Leibler divergence (KLD) Loss Function is applied to the sequence of vector to optimize the classification model by computing a cross entropy loss function between probability distribution of the sequence of vector and a target distribution of the sequence of vector, wherein the probability distribution is obtained by performing square root and normalization of predicted discrete probability distribution of the sequence of vector and wherein the target distribution is an indicator function with a value of one for the target class and zero otherwise.

5. The BiLSTM-Siamese Network Based Classifier system of claim 4, wherein the one or more hardware processors are further configured by the instructions to:

obtain, using the one or more shared weights, a plurality query embeddings by passing the one or more queries through the Siamese model, wherein the Siamese model attempts to drive the corresponding query embeddings apart, wherein query embeddings of similar queries are brought together and the query embeddings of dissimilar queries are pushed apart by at-least margin distance, wherein if a distance between the query embeddings is more than the margin distance then a loss term becomes zero and drives the query embeddings apart, and wherein the Siamese model works on a pair of queries at a time is leveraged which helps to drive the query embeddings apart in every iteration;

apply a contrastive divergence loss on the plurality of query embeddings to optimize the Siamese model; and update one or more parameters of the BiLSTM-Siamese network based classifier system.

6. The BiLSTM-Siamese Network Based Classifier system of claim 5, wherein the contrastive divergence loss is computed by:

calculating, a Euclidean distance between the plurality of query embeddings; and computing the contrastive divergence loss based on the calculated Euclidean distance.

7. One or more non-transitory machine readable information storage mediums comprising one or more instructions which when executed by one or more hardware processors causes:

obtaining by a Bidirectional Long-Short Term Memory (BiLSTM)-Siamese network based classifier, via one or more hardware processors, one or more user queries, wherein the one or more user queries comprises of a sequence of words, wherein the BiLSTM-Siamese network based classifier comprises a Siamese model and a classification model, and wherein each of the Siamese model and the classification model comprise a common base network that includes an embedding layer, a single BiLSTM layer and a Time Distributed Dense (TDD) Layer;

iteratively performing:

representing in the embedding layer of the common base network, the one or more user queries as a sequence of vector representation of each word learnt using a word to vector model, wherein the sequence of words is replaced by corresponding vectors initialized using the word to vector model, wherein the corresponding vectors are continually updated during training of the BiLSTM-Siamese network based classifier, wherein the word to vector model is used to initialize weights of the embedding layer which takes the one or more user queries as a sequence of 1-hot encoded word vectors and outputs encoded sequence of the corresponding vectors and wherein the weights of the embedding layer are updated through back-propagation;

inputting, to the single BiLSTM layer of the common base network, the sequence of vector representation of each word to generate 't' hidden states at every timestep, wherein the vector representation of each word is inputted in at least one of a forward order and a reverse order and wherein the vector representation retains context of other words both on a left hand side and a right hand side as a result at each word in the one or more user queries, and an output of a LSTM unit is controlled by a set of gates as a function of previous hidden state and input at a current timestep, and computing an internal memory as a function to decide how much information from an old memory cell is going to be forgotten along with control on how much new information is going to be stored in a current memory cell, and controls output based on the internal memory;

determining, during training of the BiLSTM-Siamese network based classifier, one or more errors pertaining to the one or more user queries, wherein the one or more errors comprise one or more target classes being determined for the one or more user queries;

generating a set of misclassified query-query pairs based on the one or more errors;

iteratively training, the Siamese model using the set of misclassified query-query pairs along with one or more correct pairs, wherein one or more weights of the common base network are shared with the Siamese model and the classification model during the training of the BiLSTM-Siamese network based classifier;

processing through the Time Distributed Dense (TDD) Layer of the common base network, an output obtained from the BiLSTM layer to obtain a sequence of vector;

obtaining, using a maxpool layer of the classification model, dimension-wise maximum value of the sequence of vector to form a final vector; and determining by a softmax layer of the classification model, at least one target class of the one or more queries based on the final vector and outputting a response to the one or more queries based on the determined target class, wherein a Square root Kullback—Leibler divergence (KLD) Loss Function is applied to the sequence of vector to optimize the classification model by computing a cross entropy loss function between probability distribution of the sequence of vector and a target distribution of the sequence of vector, wherein the probability distribution is obtained by performing square root and normalization of predicted discrete probability distribution of the sequence of vector and wherein the target distribution is an indicator function with a value of one for the target class and zero otherwise.

8. The one or more non-transitory machine readable information storage mediums of claim 7, wherein the one or more instructions when executed by the one or more hardware processors further cause:

obtaining, using the one more shared weights, a plurality query embeddings by passing the one or more queries through the Siamese model, wherein the Siamese model attempts to drive the corresponding query embeddings apart, wherein query embeddings of similar queries are brought together and the query embeddings of dissimilar queries are pushed apart by at-least margin distance, wherein if a distance between the query embeddings is more than the margin distance then a loss term becomes zero and drives the query embeddings apart, and wherein the Siamese model works on a pair of queries at a time is leveraged which helps to drive the query embeddings apart in every iteration;

applying a contrastive divergence loss on the plurality of query embeddings to optimize the Siamese model; and updating one or more parameters of the BiLSTM-Siamese network based classifier.

9. The one or more non-transitory machine readable information storage mediums of claim 7, wherein the step of applying a contrastive divergence loss comprises:

calculating, Euclidean distance between the plurality of query embeddings; and computing the contrastive divergence loss based on the calculated Euclidean distance.

\* \* \* \* \*